US011652835B1

(12) United States Patent
Agarwal et al.

(10) Patent No.: US 11,652,835 B1
(45) Date of Patent: May 16, 2023

(54) METHODS FOR SECURITY AND PRIVACY-ENFORCED AFFINITY SCORING AND DEVICES THEREOF

(71) Applicant: Shape Security, Inc., Santa Clara, CA (US)

(72) Inventors: Sumit Agarwal, Pal Alto, CA (US); Mengmeng Chen, Mountain View, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 194 days.

(21) Appl. No.: 17/071,504

(22) Filed: Oct. 15, 2020

Related U.S. Application Data

(60) Provisional application No. 62/916,070, filed on Oct. 16, 2019.

(51) Int. Cl.
| | |
|---|---|
| *G06F 15/16* | (2006.01) |
| *H04L 9/40* | (2022.01) |
| *H04L 43/04* | (2022.01) |
| *H04L 67/306* | (2022.01) |
| *H04L 43/062* | (2022.01) |

(52) U.S. Cl.
CPC .......... *H04L 63/1425* (2013.01); *H04L 43/04* (2013.01); *H04L 43/062* (2013.01); *H04L 63/0414* (2013.01); *H04L 63/20* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,043,397 B1 * | 5/2015 | Ravichandran | H02J 1/14 709/204 |
| 2014/0283069 A1 * | 9/2014 | Call | H04L 63/1483 726/23 |
| 2019/0278438 A1 * | 9/2019 | Boyd | G06F 16/958 |

* cited by examiner

*Primary Examiner* — Wing F Chan
*Assistant Examiner* — Andrew Woo
(74) *Attorney, Agent, or Firm* — Troutman Pepper Hamilton Sanders LLP (F5 Patents)

(57) ABSTRACT

This technology maintains de-identified visit data to a plurality of websites from assigned user identifiers (UIDs) corresponding to a plurality of clients. The assigned UIDs include a different assigned UID for each client-website pair, the de-identified visit data associating the assigned UIDs to a plurality of groups. A first group from the groups is determined based on first request data corresponding to a first request from a client to a web server system. First group visit data describing visits by assigned UIDs belonging to the first group is obtained from the de-identified visit data. Affinity data, comprising at least one affinity score for at least one of the websites, is generated based on the first group visit data. Generation of affiliate content based on the affinity data is caused, where the affiliate content corresponds to the at least one of the websites.

20 Claims, 8 Drawing Sheets

FIG. 2A

| CLIENT PROPERTY VALUE 202 | CLIENT PROPERTY VALUE 204 | CLIENT PROPERTY VALUE 206 |
|---|---|---|
| GROUP ID 210 ||||

FIG. 2B PROCESSED INTERACTIONS:

1: client A visits WS1
2: client A visits WS2
3: client B visits WS1
4: client C visits WS1
5: client D visits WS2

220

|   | GROUP ID | ASSIGNED UID | WEBSITE |
|---|---|---|---|
| 1: (client A) | GID1(202-A, 204-A, 206-A) | UID1 | WS1 |
| 2: (client A) | GID1(202-A, 204-A, 206-A) | UID2 | WS2 |
| 3: (client B) | GID1(202-A, 204-A, 206-A) | UID3 | WS1 |
| 4: (client C) | GID2(202-A, 204-A, 206-B) | UID4 | WS1 |
| 5: (client D) | GID3(202-C, 204-C, 206-C) | UID5 | WS2 |

| GROUP ID | WS1 | WS2 |
|---|---|---|
| GID1 | UID1, UID3 | UID2 |
| GID2 | UID4 |  |
| GID3 |  | UID5 |

232
234
236

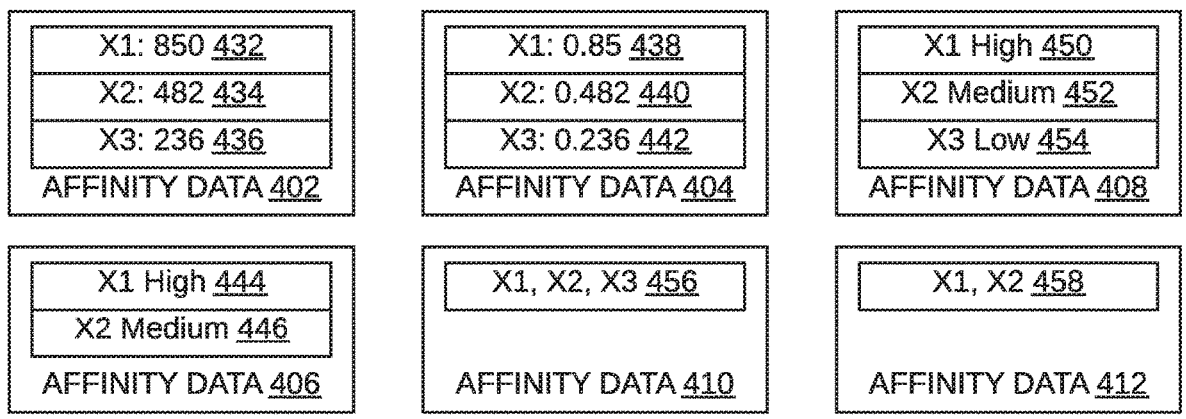
FIG. 4A
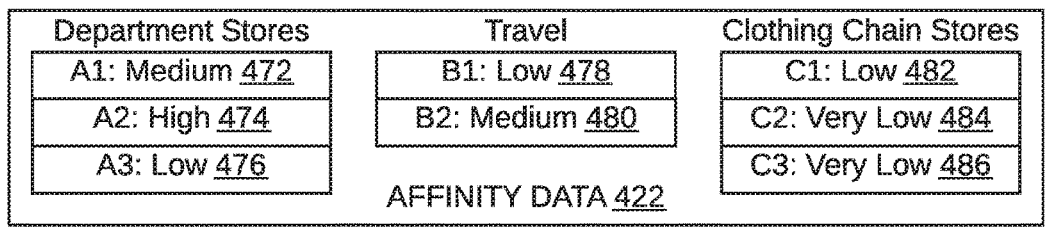
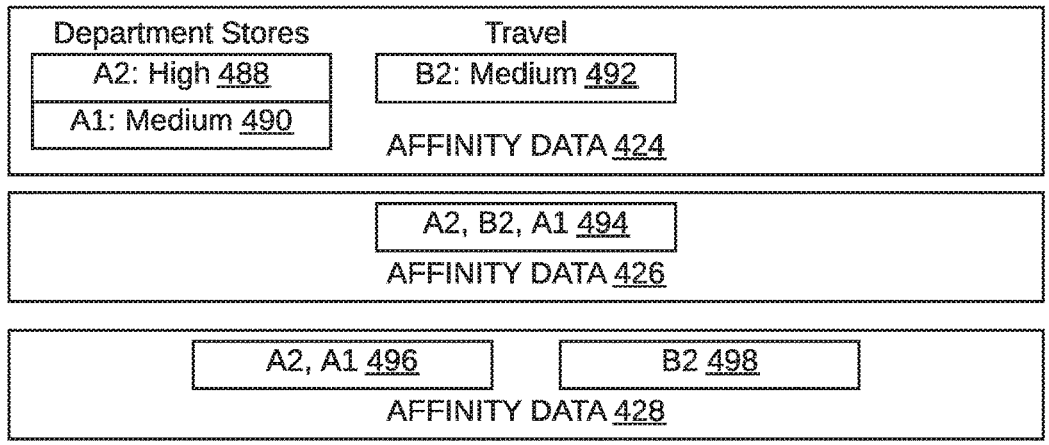
FIG. 4B
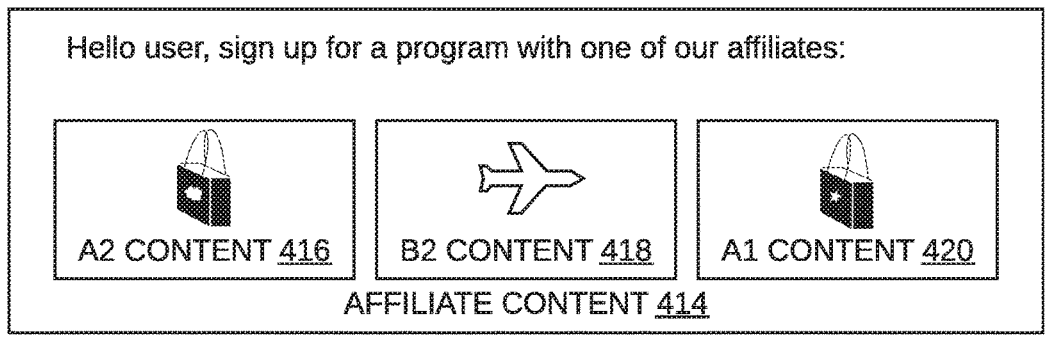
FIG. 4C

FIG. 5A
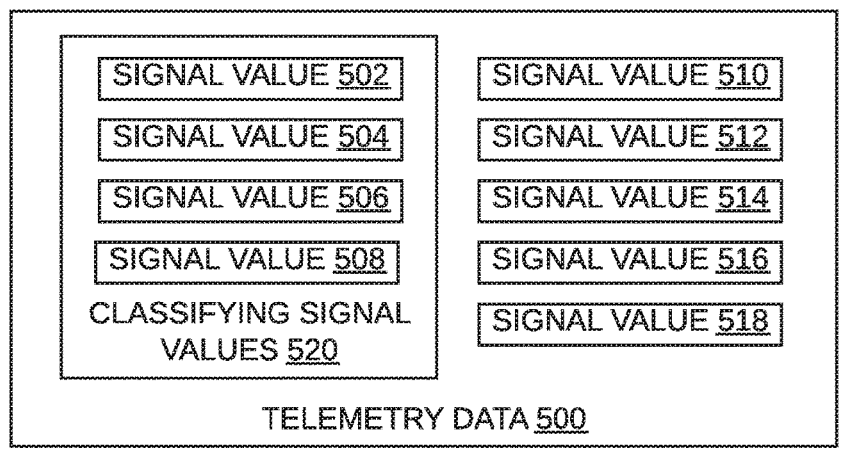
FIG. 5B PROCESSED INTERACTIONS:
1: client A (assigned UID1) visits WS1
2: client A (assigned UID2) visits WS2
3: client B (assigned UID3) visits WS1
4: client C (assigned UID4) visits WS1
5: client D (assigned UID5) visits WS2
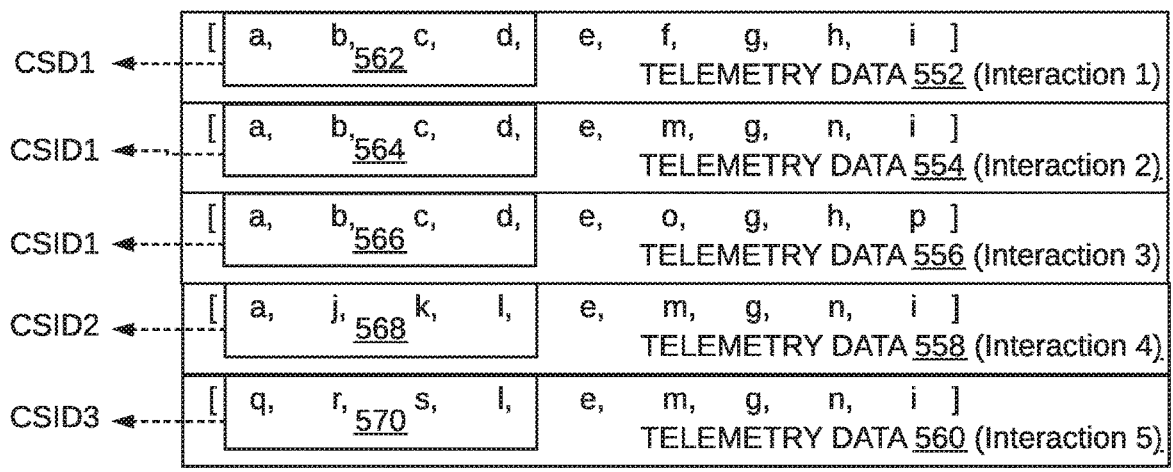
FIG. 5C
| GROUP ID | UID | SERVER |
|---|---|---|
| CSID1 | UID1 | WS1 |
| CSID1 | UID2 | WS2 |
| CSID1 | UID3 | WS1 |
| CSID2 | UID4 | WS1 |
| IDSD3 | UID5 | WS2 |
580

METHODS FOR SECURITY AND PRIVACY-ENFORCED AFFINITY SCORING AND DEVICES THEREOF

This application claims the benefit of U.S. Provisional Patent Application Ser. No. 62/916,070 filed Oct. 16, 2019, which is hereby incorporated by reference in its entirety.

FIELD

This technology generally relates to security techniques applicable to client/server systems, and relates more specifically to security and privacy-enforced affinity scoring.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An exemplary method implemented by a security system comprising one or more affinity server devices, web server systems, or client computing devices includes maintaining de-identified visit data to a plurality of websites from a plurality of assigned user identifiers (UIDs) corresponding to a plurality of clients. The plurality of assigned UIDs include a different assigned UID for each client-website pair and the de-identified visit data associates the plurality of assigned UIDs to a plurality of groups. A first group from the plurality of groups is determined based on first request data corresponding to a first request from a client to a web server system. First group visit data, that describes visits to a set of the websites by assigned UIDs belonging to the first group, is obtained from the de-identified visit data. Affinity data is generated based on the first group visit data and comprises at least one affinity score for a website of the plurality of websites. Generation of affiliate content based on the affinity data is caused, where the affiliate content corresponds to one or more websites of the plurality of websites.

An exemplary non-transitory computer readable medium having stored thereon instructions comprising executable code that, when executed by one or more processors, causes the processors to maintain de-identified visit data to a plurality of websites from a plurality of assigned user identifiers (UIDs) corresponding to a plurality of clients. The plurality of assigned UIDs include a different assigned UID for each client-website pair and the de-identified visit data associates the plurality of assigned UIDs to a plurality of groups. A first group from the plurality of groups is determined based on first request data corresponding to a first request from a client to a web server system. First group visit data, that describes visits to a set of the websites by assigned UIDs belonging to the first group, is obtained from the de-identified visit data. Affinity data is generated based on the first group visit data and comprises at least one affinity score for a website of the plurality of websites. Generation of affiliate content based on the affinity data is caused, where the affiliate content corresponds to one or more websites of the plurality of websites.

An affinity server apparatus, comprising memory comprising programmed instructions stored thereon and one or more processors configured to be capable of executing the stored programmed instructions to maintain de-identified visit data to a plurality of websites from a plurality of assigned user identifiers (UIDs) corresponding to a plurality of clients. The plurality of assigned UIDs include a different assigned UID for each client-website pair and the de-identified visit data associates the plurality of assigned UIDs to a plurality of groups. A first group from the plurality of groups is determined based on first request data corresponding to a first request from a client to a web server system. First group visit data, that describes visits to a set of the websites by assigned UIDs belonging to the first group, is obtained from the de-identified visit data. Affinity data is generated based on the first group visit data and comprises at least one affinity score for a website of the plurality of websites. Generation of affiliate content based on the affinity data is caused, where the affiliate content corresponds to one or more websites of the plurality of websites.

A security system, comprising one or more affinity server apparatuses, server devices, or clients with memory comprising programmed instructions stored thereon and one or more processors configured to be capable of executing the stored programmed instructions to maintain de-identified visit data to a plurality of websites from a plurality of assigned user identifiers (UIDs) corresponding to a plurality of clients. The plurality of assigned UIDs include a different assigned UID for each client-website pair and the de-identified visit data associates the plurality of assigned UIDs to a plurality of groups. A first group from the plurality of groups is determined based on first request data corresponding to a first request from a client to a web server system. First group visit data, that describes visits to a set of the websites by assigned UIDs belonging to the first group, is obtained from the de-identified visit data. Affinity data is generated based on the first group visit data and comprises at least one affinity score for a website of the plurality of websites. Generation of affiliate content based on the affinity data is caused, where the affiliate content corresponds to one or more websites of the plurality of websites.

This technology provides a number of advantages including providing methods, non-transitory computer readable media, devices and systems to enable security and privacy-enforced affinity scoring. With examples of this technology, a web content provider may better understand its users and may better and relatively simply protect the privacy of users without the web content provider having to install any new hardware or software on its own server systems. Additionally, with examples of this technology, an organization can aggregate and utilize data received across many entities that operate many domains, including telemetry data and/or analyzed telemetry data, to generate or otherwise initiate providing relevant affiliate content. Further, examples of this technology are better able to provide relevant affiliate content in a privacy-enforced manner that is compatible with privacy regulations or other frameworks. Additional features and advantages are apparent by way of the examples described and illustrated herein.

BRIEF DESCRIPTION OF THE DRAWINGS

FIG. 2A is a table of an example of client property values for a group ID;

FIG. 2B is a diagram of an example of processed interactions and de-identified visit data;

FIG. 2C is an example of a table of group visit data;

FIG. 4A is a diagram of an example of affinity data comprising affinity scores for at least one affiliate website;

FIG. 4B is a diagram of an example of affinity data comprising affinity scores for affiliate websites of two or more affiliate types;

FIG. 4C is a diagram of an example of affiliate content generated based on affinity data;

FIG. 5A is a diagram of an example of telemetry data;

FIG. 5B is a diagram of an example of telemetry data and CSID for a set of interactions;

FIG. 5C is a table of an example of de-identified visit data;

Figure 1:
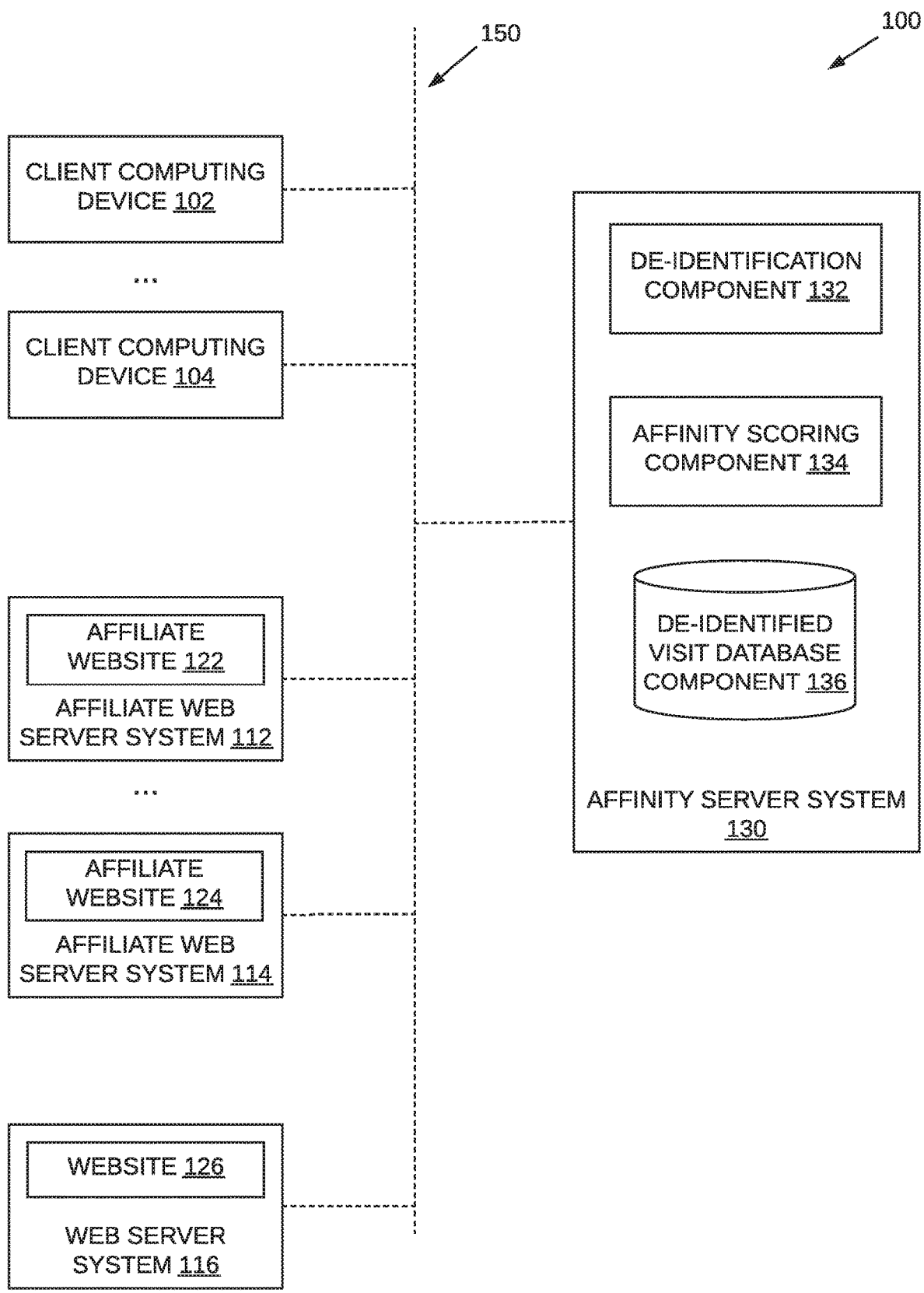
FIG. 1 is a block diagram of an exemplary system that includes an example of an affinity server system for security and privacy-enforced affinity scoring.

While each of the drawing figures illustrates a particular example for purposes of illustrating a clear example, other examples may omit, add to, reorder, or modify any of the elements shown in the drawing figures. For purposes of illustrating clear examples, one or more figures may be described with reference to one or more other figures, but using the particular arrangement illustrated in the one or more other figures is not required in other examples.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the terms "such as", "e.g.", "for example", and the like describe one or more examples but are not limited to the described example/s; the terms "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

"Instrumentation code" refers to source code, bytecode, or binary software that is executed on a computer. For example, instrumentation code may be JavaScript that generates data on a client and sends that data, referred to as telemetry data, to a server. Also, for example, instrumentation code may be a pre-compiled library that embedded into a mobile application using a compiler or linker. The instrumentation code may send the telemetry data to a server over one or more requests or transactions. The instrumentation code may attach telemetry data to one or more subsequent requests or transactions.

General Overview

This document generally describes systems, methods, devices, and other techniques for security and privacy-enforced affinity scoring. An entity operating a web server system for a set of users may wish to present its users with options for various services provided by other entities, such as affiliates, partners, and other entities. For example, a bank may wish to present an ordered list of private label credit card programs to a user based on affinity data calculated for the user while meeting privacy obligations to the user. Such content is referred to herein as "affiliate content".

An affinity server system generates affinity data regarding the user on behalf of the entity so that the entity can better provide relevant affiliate content in a privacy-enforced manner that is compatible with privacy regulations or other frameworks. The affinity server system maintains de-identified visit data for visits to a plurality of websites from a plurality of assigned UIDs corresponding to a plurality of clients. An assigned UID belongs to a group, which may be determined based on one or more client property values. The plurality of assigned UIDs includes a different assigned UID for each client-website pair. The affinity server system updates the de-identified visit data by processing request data for a plurality of requests from the plurality of clients to the plurality of websites.

The affinity server system generates affinity data corresponding to a particular client computing device using the de-identified visit data. In some examples, the affinity server system receives particular request data corresponding to a particular request from a client computing device to a web server system that uses the affinity data to generate affiliate content that is relevant to a user of the client computing device. The affinity server system determines a particular group based on the particular request data, and obtains group visit data for the particular group. The group visit data describes aggregated and de-identified visits to one or more websites by clients belonging to a group that the user belongs to. For example, the group visit data may include visit data for assigned UIDs belonging to the particular group that have visited each of a set of websites.

The affinity server system generates affinity data based on the group visit data. The affinity server system causes generation of affiliate content served in association with web content served by the web server system. For example, the affinity server system may cause generation of the affiliate content by sending the affinity data to the web server system. The affiliate content may include ordered content for one or more websites, where the ordering is based on the affinity data.

The techniques for group-based affinity scoring described herein are compatible with privacy regulations, such as the Gramm-Leach-Bliley Act (GLBA), the EU General Data Protection Regulation (GDPR), the California Consumer Privacy Act (CCPA), and the like. The techniques for group-based affinity scoring can be implemented with pseudonymized request data as well as aggregated data associated with a group rather than any individual user.

The various techniques described herein may achieve one or more of the following advantages: a web content provider may better understand its users; the web content provider may protect the privacy of users; the protection may be provided relatively simply for the web content providers in certain implementations; in particular implementations, such protection can be added without the web content provider having to install any new hardware or software on its own server systems; code and/or systems can be provided flexibly by an organization; such an organization can aggregate data received across many entities that operate many domains, including telemetry data and/or analyzed telemetry data; such an organization can integrate one or more security measures for its customers. Additional features and advantages are apparent from the specification and the drawings.

System Overview

FIG. 1 illustrates a computer system that includes an affinity server system in an example. In this example, a computer system or network environment 100 includes a plurality of web server systems 112-116, a plurality of client computing devices 102-104, and an affinity server system 130, although the systems could have other types and/or numbers of other systems, devices or other elements in other configurations. Additionally, in this example, the client computing devices 102-104, the web server systems 112-116 and the affinity server system 130 communicate over one or more networks 150. The network(s) 150 may include one or more local area networks (LANs) and/or one or more wide area networks, such as the Internet. Some examples and/or examples are described with respect to a specified component (e.g. client computing device. Unless otherwise specified, the description may also apply to another similar component (e.g. client computing device 104).

In this example, the web server systems 112-116 host websites 122-126 and make web content belonging to the websites 122-126 available to one or more of the client computing devices 102-104. As used herein, the term "website" refers to a collection of web pages, web resources, and other web content made available over the Internet. Often, a website shares a single domain name or set of related domain names that are owned or controlled by a common entity. A website may include web page content accessible over the Internet through a browser, and/or web content that is accessible over the Internet from another client application. Such applications may include web applications executing in a browsers, and/or native applications installed on the client computing devices 102-104. The web content associated with the websites 122-126 may, by way of example only, include one or more web pages, images, audio, video, messages, files, data, scripts, services, application content, and other content available over the network 150, such as but not limited to the Internet. In some examples, the websites 122-126 includes any data, instructions, or other content provided by the web server systems 112-116 over the network 150, including responses to requests from any application executing on the client computing devices 102-104.

In some examples, the affinity server system 130 generates affinity data regarding a particular client computing device 102 on behalf of a web server system 116. Affinity data regarding a particular client computing device 102 describes visits from the client computing device 102 to a set of affiliate websites 122-124 hosted by affiliate web server systems 112-114. The affinity server system 130 maintains and updates de-identified visit data for the affiliate websites 122-124 and provides group-based affinity scoring for web for the affiliate websites 122-124.

The entity that owns, controls, and/or maintains the web server system 116 may have a business relationship with one or more affiliates that own, control and/or maintain one or more affiliate web server systems 112-114. Alternatively and/or in addition, one or more affiliates may have no formal agreement or relationship with the entity that owns, controls, and/or maintains the web server system 116. Each of the websites 122-124 hosted by the affiliate web server systems 112-114 are also referred to herein as affiliate websites 122-124. An affiliate may be an entity, such as but not limited to a corporation, business, non-profit, or other party. An affiliate may own, control, and/or maintain an affiliate web server system 112-124. Alternatively and/or in addition, an affiliate may own, control, maintain, and/or publish an affiliate website 122-124.

Affinity Server System

In this example, the affinity server system 130 generates affinity data corresponding to client computing devices 102-104 on behalf of the web server system 116 using the de-identified visit data. The de-identified visit data includes data describing visits to the affiliate websites 122-124 from users using the client computing devices 102-104. De-identified visit data is described in greater detail with examples hereinafter.

In some examples, the affinity server system 130 includes a de-identification component 132, an affinity scoring component 134, and a de-identified visit database component 136, although the system may include other types and/or numbers of other components or other elements in other configurations. The de-identification component 132 maintains de-identified visit data to a plurality of websites from a plurality of clients. The de-identification component 132 may update the de-identified visit data by processing request data for a plurality of interactions between the plurality of client computing devices 102-104 and the plurality of affiliate websites 122-124. For example, the de-identification component 132 may receive and process request data for a request from a client computing device 102 to an affiliate web server system 112. As used herein, the term "request data" refers to data describing a request from one of the client computing devices 102-104. For example, request data may include at least a the request, portions of the request, and/or other data relating to the request, such as a source and/or destination of the request, other address information associated with the request, header or footer data accompanying the request, and/or any other data that describes the request.

In some examples, a web server system 116 that requests affiliate data may also be an affiliate web server system. That is, the affinity server system 130 may maintain de-identified visit data corresponding to the website 126, and another web server system (e.g. web server system 112) may request affinity data regarding visits to the corresponding website 126. In some examples, the web server system 116 may request affiliate data that includes affinity data that includes visits to its own website 126.

In this example, the affinity server system 130 may store de-identified visit data in a de-identified visit database component 136, although the de-identified visit data may be stored in other locations. For example, the de-identification component 132 may maintain de-identified visit data by processing request data and updating the de-identified visit data in the de-identified visit database component 136. In some examples, the de-identification component 132 updates the de-identified visit data by sending one or more commands or requests to the de-identified visit database component 136.

In some examples, the de-identified visit database component 136 includes a database that stores de-identified visit data. As used herein, the term "database" refers to one or more data stores for at least one set of data. The data store may include one or more tangible and/or virtual data storage locations, which may or may not be physically co-located. A simple example of a database is a text file used to store information about a set of data. Another example of a database is one or more data stores that are maintained by a server that processes requests to perform operations on the database. In some examples, the de-identified visit database component 136 includes a database management system (DBMS). As used herein, the term "maintain" refers to performing operations on one or more sets of data stored in a database, such as, but not limited to accessing the database, adding data to the database, removing data from the database, modifying data in the database, searching the database, retrieving data from the database, logging events related to set(s) of data stored in the database, communicating with clients to provide access to the database, and/or other operations related to the database that is maintained.

In this example, the affinity scoring component 134 generates affinity data regarding a client computing device 102 on behalf of the web server system 116. The affinity data enables the web server system 116 to better provide relevant affiliate content in a privacy-enforced manner that is compatible with privacy regulations or other frameworks. In some examples, the affinity scoring component 134 generates affinity data corresponding to a particular client computing device 102 using the de-identified visit data stored in the de-identified visit database component 136.

The affinity server system 130 and/or its components (e.g. de-identification component 132, an affinity scoring component 134, and a de-identified visit database component 136) are presented herein as individual components for ease of explanation; any action performed by or to one or more components of the affinity server system 130 may be considered performed by or to the affinity server system 130. The affinity server system 130 and/or its components may be implemented as one or more dependent and/or independent processes, and may be implemented on one or multiple computers; for example, a component may be implemented as a distributed system; alternatively and/or in addition, multiple instances of one or more components may be implemented. Furthermore, a component shown may be implemented fully and/or partially in one or multiple programs and/or processes, and two or more components shown may be implemented fully and/or partially in the same program and/or process.

Affinity Data Overview

In this example, an affinity server system 130 generates affinity data regarding a client computing device 102 on behalf of a web server system 116. The affinity data allows the web server system 116 to better provide relevant affiliate content in a privacy-enforced manner that is compatible with privacy regulations or other frameworks. In some examples, the affinity server system 130 maintains de-identified visit data (e.g. de-identified visit data 220) for a plurality of interactions between client computing devices 102-104 and a plurality of affiliate websites 122-124. When the affinity server system 130 generates affinity data for a particular client computing device 102, the affinity server system 130 determines a particular group that the client computing device 102 belongs to, obtains group visit data for the particular group, and generates the affinity data based on the group visit data, which are described in greater detail hereinafter.

One or more conceptual view of data are presented herein for ease of explanation; the techniques described herein do not require a particular data structure or a particular organization of the data as illustrated.

De-identified Visit Data

De-identified visit data describes one or more interactions between the client computing devices 102-104 and the affiliate web server systems 112-114. The affinity server system 130 may process request data for a plurality of requests from a plurality of clients to the plurality of websites hosted by the affiliate web server systems 112-114.

Unless otherwise specified, a client may for example refer to a client computing device 102, a browser executing on the client computing device 102, another application executing on the client computing device 102, and/or a user of the client computing device 102. For example, individual user agents operating on the same client computing device 102 may be treated as unique clients that all interact with web server systems 112-116 from the client computing device 102. A user agent is a software agent executing on a client computing device 102, such as a browser, a web-enabled application, or other software that interacts with a web server system 112.

In this example, the affinity server system 130 assigns a client one or more assigned user IDs (assigned UIDs), although other types and manners of identification may be used. An assigned UID may include any identifier that is unique from another assigned UID. For example, an assigned UID may include username, name, and email address, although other types of information may be included. In some examples, an assigned UID includes an obfuscated identifier. For example, the affinity server system may de-identify visit data by assigning an obfuscated identifier. Examples of an obfuscated identifier include, but are not limited to one or more of the following: (1) a pseudonymized value, e.g. a hashed username; (2) or anonymized/de-identified value (a token value that represents a user, but cannot be used to identify a user, e.g., a random value assigned to a user without being associated with any personal data that could identify the underlying user).

Referring to FIG. 2B, a diagram of an example of processed interactions and de-identified visit data is illustrated. As used herein, a visit to a website (e.g. website 122) may include a request from a client computing device (e.g. one of the client computing devices 102-104) to a web server system (e.g. one of the web server systems 112-116), a session between the client computing device and the web server system, a particular type of web transaction, or another interaction between the client computing device and the web server system. In this example, the illustrated de-identified visit data 220 is generated by processing request data describing five interactions. Interaction 1 is between client A and website WS1. Interaction 2 is between client A and website WS2. Interaction 3 is between client B and website WS1. Interaction 4 is between client C and website WS1. Interaction 5 is between client D and website WS2.

In some examples, the affinity server system 130 assigns different UIDs for each client-website pair. For example, the affinity server system 130 may assign client A and website WS1 a first UID, UID1. The affinity server system 130 may assign the same client A and a different website WS2 a second UID, WS2. When the affinity server system 130 processes request data for Interaction 1 (client A visits WS1), the affinity server system 130 stores data reflecting the visit in association with UID1. When the affinity server system 130 processes request data corresponding to Interaction 2 (client A visits WS2), the affinity server system 130 stores data reflecting the visit in association with UID2. In this way, the de-identified visit data 220 in this example is generated in a way that does not include any data that can track the behavior of client A across multiple websites (e.g. WS1 and WS2).

The affinity server system 130 may also assign different UIDs for different clients (e.g. one of the client computing devices 102-104) visiting the same website (e.g. one of the websites 122-126). For example, the affinity server system 130 may assign client B and website WS1 a third UID, UID3. The affinity server system 130 may store data reflecting Interaction 1 (client A visits WS1) in association with UID1, and may store data reflecting Interaction 3 (Client B visits WS1) in association with UID3.

The affinity server system 130 updates the de-identified visit data by processing request data for a plurality of requests from the plurality of clients (e.g. client computing devices 102-104) to the plurality of websites (e.g. websites 122-126). In some examples, the affinity server system 130 or a web server system (e.g. one of the web server systems 112-116) provides the client computing device (e.g. one of the client computing devices 102-104) with the assigned UID in association with the corresponding website. For example, the affinity server system 130 or the corresponding one of the web server systems 112-116 may set a cookie at the client (e.g. one of the client computing devices 102-104) that includes the assigned UID. The client (e.g. one of the client computing devices 102-104) may provide the assigned UID during future visits to the corresponding website.

Group Identifier (ID)

In some examples, the affinity server system 130 determines a group for each assigned UID and/or interaction based on one or more client property values. For example, when processing request data for a particular interaction, the affinity server system 130 may determine a group and a UID for the particular interaction. In some examples, the group is determined based on one or more client property values.

Referring to FIG. 2A, a table of an example of client property values for a group ID is illustrated. Group ID 210 is the group ID for a particular group. Group ID 210 is generated based on one or more client property values 202-206. The client property values may be determined based on the request data. For example, one or more client property values 202-206 may be part of the request, such as in the request header, in a cookie accompanying the request, and/or the request body.

Examples of client property values 202-206 include an IP address, an access point name (APN), user agent information, network properties, operating system properties, browser properties, installed software properties, display size, other hardware properties, device configuration properties, and the like. In some examples, an affinity server system 130 receives one or more client property values 202-206 that are collected when instrumentation code executes on the client computing device (e.g. one of the client computing devices 102-104). Instrumentation code is described in greater detail hereinafter.

In some examples, the client property values 202-206 are selected to achieve a particular grouping granularity. For example, if clients are grouped based on APN, there will be fewer expected groups than if clients are grouped based on IP address.

When a client is assigned two or more assigned UIDs, the assigned UIDs may still be associated with the same group ID. For example, the client-website pair (A, WS1) is assigned UID1, while the client-website pair (A, WS2) is assigned UID2. Both UID1 and UID2 may in this example belong to group GID1.

In some examples, when two clients operate on the same client computing device (e.g. one of the client computing devices 102-104), the client property values 202-206 are selected such that the two clients are associated with the same group ID. For example, if client A and client B are both user agents operating on the same client computing device (e.g. one of the client computing devices 102-104), they may belong to the same group if the group ID is determined based on a common client property to the client computing device, such as an IP address. It is possible that one or more other clients operating on different client computing devices may also belong to the same group.

Group Visit Data

Group visit data describes aggregated and de-identified visits to one or more websites by clients belonging to a particular group. For example, group visit data may include visit data for assigned UIDs belonging to the particular group that have visited one or more websites in a set of websites.

Referring to FIG. 2C, an example of a table of group visit data is illustrated. Table 230 includes group visit data 232-236 for a plurality of groups: GID1, GID2, and GID3. Group visit data 232 for GID1 indicates that two assigned UIDs belonging to GID1 visited website WS1, and one assigned UID belonging to GID1 visited website WS2. Group visit data 234 for GID2 indicates that one assigned UID belonging to GID2 visited website WS1, and no assigned UID belonging to GID2 visited website WS2. Group visit data 236 for GID3 indicates that no assigned UID belonging to GID3 visited website WS1, and one assigned UID belonging to GID3 visited website WS2.

In some examples, the affinity server system 130 generates group visit data 232 pertaining to a particular group from de-identified visit data 220. For example, for group visit data 232, the affinity server system 130 may obtain de-identified visit data associated with group ID GID1. In some examples, obtaining the group visit data may include further processing the relevant de-identified visit data associated with GID1.

Tracking Additional Visit Data

Figure 3A:
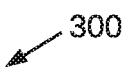
FIG. 3A is a table of an example of de-identified visit data with additional visit data.

An affinity server system (e.g. affinity server system 130) may store additional values in the de-identified visit data. In some examples, the group visit data and/or the affinity data generated by the affinity server system 130 is based on the additional visit data. A table of an example of de-identified visit data with additional visit data is illustrated in FIG. 3A.

De-identified visit data 300 is based on the same processed interactions as de-identified visit data 220. For example, the de-identified visit data 300 stores additional visit count data assigned UIDs that visit a particular website. When a client with a particular UID visits a particular website, the affinity server system 130 may increment a stored value for a number of visits to the particular website from the particular UID.

Other types of additional visit data may also be stored. For example, the additional visit data may include the time of a most recent visit by the assigned UID, other request time information, session count information, session duration information, and/or other data that may read on whether a particular website is more or less relevant to clients belonging to a particular group. The additional visit data may be recorded over a time period, such as the time that the affinity server system 130 was monitoring transactions for the particular website, or a specified period or duration.

Figure 3B:
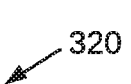
FIG. 3B is a table of another example of group visit data.

Referring to FIG. 3B, a table of another example of group visit data is illustrated. Table 320 includes group visit data 322-326 for groups: GID1, GID2, and GID3. Group visit data 322 for GID indicates 4+2=6 visits from UID1 and UID 3 to website WS1, and 1 visit from UID 2 to website WS2. Group visit data 324 for GID2 indicates 1 visit from UID4 to website WS1, and no visits to website WS2. Group visit data 326 for GID3 indicates no visits to WS1 and 2 visits from UID5 to website WS2.

Affinity Data

The affinity server system (e.g. affinity server system 130) generates affinity data corresponding to a particular client computing device (e.g. one of the client computing devices 102-104). The affinity data allows, in this example, a web server system (e.g. web server system 116) to better provide relevant affiliate content in a privacy-enforced manner that is compatible with privacy regulations or other frameworks. The affinity data is based on the group visit data that describes aggregated and de-identified visits to one or more websites by clients belonging to a group that the particular client computing device belongs to. The affinity data includes any de-identified and aggregated data usable to provide relevant affiliate content. A basic version of the affinity data is the unprocessed group visit data.

Referring to FIG. 4A, a diagram of an example of affinity data comprising affinity scores for at least one affiliate website is illustrated. Each example of affinity data 402-412 includes one or more affinity scores 432-458 for one or more affiliate websites X1-X3. In this example, an affinity score for a website may be a numeric score, although other types of scoring systems may be used. Additionally in this example, affinity data 402 includes numeric affinity scores 432-436 for affiliate websites X1-X3. A simple example of a numeric affinity score generated based on de-identified visit data is to use the de-identified visit data for a particular website (e.g. a number of requests to the particular website over a period of time or another visit metric) as the affinity score for the website.

In some examples, the affinity data corresponding to the particular client computing device (e.g. one of the client computing devices 102-104) includes at least one affinity score for at least one website (e.g. affiliate websites 122-124). An affinity score may be a probabilistic value, such as a correlation or another value derived based on principles of probability and/or statistics. For example, affinity data 404 includes affinity scores 438-442 that include probabilistic values between 0 and 1 for affiliate websites X1-X3.

An affiliate score for a website may be a level or other categorization. For example, affinity data 408 includes an affinity score 450 of "high" for website X1, an affinity score 452 of "medium" for website X2, and an affinity score 454 of "low" for website X3.

The affinity data may exclude one or more affinity scores for one or more affiliate websites (e.g. affiliate websites 122-124), even if the corresponding de-identified visit data includes website visit data for the one or more affiliate websites. For example, an affinity score may be omitted when it does not meet a threshold value for inclusion in the affinity data. For example, affinity data 406 may be generated based on the same underlying de-identified visit data as affinity data 408 and a threshold value of "medium". In this example, affinity data 406 includes an affinity score 444 of "high" for website X1, using an affinity score 446 of "medium" for website X2. Affinity data 406 does not include an affinity score for website X3 because the affinity score "low" for website X3 is below the threshold value of "medium".

In some examples, affinity data includes a ranking or an ordered listing of one or more affiliate websites. For example, affinity data 410 may include an ordering 456 of websites X1, X2, and X3. The ordering 456 is generated based on the corresponding de-identified visit data. The ordering 456 implicitly includes affinity scores for affiliate websites X1, X2 and X3. For example, affiliate website X1 is listed in the first position, affiliate website X2 is listed in the second position, and affiliate website X3 is listed in the third position. In other words, the ordering 456 has a ranking that is usable as an affinity score for the websites X1, X2 and X3.

Affinity data may include an ordering of affiliate websites (e.g. affiliate websites 122-124) that excludes one or more affiliate websites, even if the corresponding de-identified visit data includes website visit data for the one or more affiliate websites. For example, affinity data 412 includes an ordering 458 that includes affiliate websites X1 and X2, while omitting affiliate website X3. In some examples, the ordering 458 may exclude one or more affiliate websites based on a threshold value, such as a threshold value of an intermediate affinity score calculated in order to generate an ordering 458 or other ranking. Alternatively and/or in addition, the ordering may be based on a number of positions available in the ordering 458. For example, higher-scoring websites may be prioritized over lower-scoring websites in the affinity data if only two affiliate websites will be featured in affiliate content.

Generating Affinity Data Based On Two Or More Affiliate Types

In some examples, affinity data includes one or more affinity scores for each of two or more affiliate types. An affiliate may be categorized as a particular affiliate type. For example, an affiliate that sells a broad variety of consumer goods may be categorized as a "Department Stores", an affiliate that operates passenger planes may be categorized as "Travel", and an affiliate that manufactures and sells a particular clothing brand may be categorized as "Clothing Chain Stores".

Referring to FIG. 4B, a diagram of an example of affinity data comprising affinity scores for affiliate websites of two or more affiliate types is illustrated. Each example of affinity data 422-428 includes one or more affinity score 472-498 for one or more affiliate websites (e.g. affiliate websites 122-124). For example, affinity data 422 includes affinity scores 472-476 for websites A1, A2 and A3 of a first affiliate type (Department Stores), affinity scores 478-480 for websites B1 and B2 of a second affiliate type (Travel), and affinity scores 482-486 for websites C1, C2 and C3 of a third affiliate type (Clothing Chain Stores).

Affinity data 424 is generated based on the same underlying de-identified visit data as affiliate affinity data 422, for the same affiliate types, using a threshold value to exclude one or more affiliate websites (e.g. affiliate websites 122-124). In this example, affinity data 424 includes affinity scores 488-490 for websites A2 and A1 for the first affiliate type (Department Stores), and affinity score 492 for websites B2 of the second affiliate type (Travel). No affinity scores are included for any websites of the third affiliate type (Clothing Chain Stores) because no website of the third affiliate type has an affinity score that meets a threshold value of "Medium". In some examples, one or more affiliate affinity scores are ordered within an affiliate type. For example, the affinity scores 488-490 for websites A2 and A1 are sorted by affinity score value within the affiliate type (Department Store) websites.

In some examples, affinity data includes a ranking or an ordered listing of one or more affiliate websites (e.g. affiliate websites 122-124). The ordering may be combined across two or more affiliate types, or may be within each affiliate type. For example, affinity data 426 includes an ordering 494 of affiliate websites by score. Website A2, with an affinity score of "High", is listed first in the ordering 494. Website B2, with an affinity score of "Medium", is listed second in the ordering 494. Website A1, with an affinity score of "Medium", is listed third in the ordering 494.

When affiliate websites are listed in an ordering, the ordering may be based directly on an intermediate affinity score, or one or more other factors. Affinity data 428 includes two orderings 496 and 498 of affiliate websites, with each ordering containing affiliate websites of a specific affiliate type.

Affiliate Content Based On Affinity Data

An affinity server system (e.g. affinity server system 130) uses the affinity data (e.g. affinity data 402-428) to generate affiliate content. A diagram of an example of affiliate content generated based on affinity data is illustrated in FIG. 4C.

Affiliate content 414 is generated based on affinity data 426. Affiliate content 414 includes individual affiliate content 416-420 for one or more affiliates A2, B2, and A1 that are selected based on the affinity data 426. The individual affiliate content 416-420 may be presented in an ordering that is determined based on the affinity data 426. In some examples, the affiliate content 416-420 includes web content that links to or otherwise interacts with the corresponding affiliate website A2, B2, or A1.

The affiliate content 414 is generated based on request data for a particular request from a particular client computing device (e.g. client computing devices 102-104) to a particular web server system (e.g. web server system 116). The affiliate content 414 is served to the particular client computing device in association with web content served by the particular web server system, such as web content belonging to a website (e.g. website 126) hosted by the web server system. For example, in response to the particular request, the web server system may submit a request to the affinity server system (e.g. affinity server system 130) that includes the request data for the particular request. The affinity server system (e.g. affinity server system 130) may respond to the web server system with the affinity data, allowing the web server system to generate the affiliate content 414, and serve the affiliate content 414 to the client computing device.

In some examples, the affinity server system 130 may obtain the request data for the particular request without receiving it from the web server system. For example, when the affinity server system 130 is a reverse proxy server system positioned between the client computing device and the web server system, the affinity server system 130 may receive the request, process the request to obtain the request data, and forwarding the request to the web server system 116.

Alternatively and/or in addition, the affinity server system 130 may generate affinity content code and provide the affinity content code for the client computing device (e.g. client computing device 102-104). For example, the affinity server system (e.g. affinity server system 130) may provide the affinity content code directly to the client computing device (e.g. affinity server system 130), or provide the affinity content code to the web server system (e.g. one of the web server systems 112-116). When executed at the client computing device (e.g. one of the client computing devices 102-104), the affinity content code displays the affiliate content. In some examples, when the affinity content code is executed at the client computing device (e.g. one of the client computing devices 102-104), the affiliate content code obtains individual affiliate content 416-420 for one or more affiliate websites from the Internet. For example, when executed, the affiliate content code can obtain individual affiliate content 416-420 from the affiliate web server systems (e.g. one or more affiliate web server systems 112-114), or another web server system.

Instrumentation Code

In some examples, an affinity server system (e.g. affinity server system 130) uses instrumentation code to collect telemetry data at client computing devices (e.g. client computing devices 102-104). The affinity server system 130 may use the collected telemetry data to generate a group ID for a particular request between a client computing device and a web server system (e.g. web server systems 112-116).

As used herein, the term "instrumentation code" refers to source code, bytecode, binary software, or other computer code that is executed on a computer to collect telemetry data at the computer. For example, instrumentation code may be JavaScript that collects and/or otherwise generates data on a client computing device (e.g. one of the client computing devices 102-104), referred to herein as telemetry data. The instrumentation code may also include instructions to send the telemetry data to the affinity server system 130.

In some examples, the affinity server system 130 provides instrumentation code to a client computing device (e.g. one of the client computing devices 102-104) when the client computing device interacts with a web server system (e.g. one of web server systems 112-116). For example, the affinity server system 130 may provide instrumentation code for execution at a client computing device (e.g. one of the client computing devices 102-104) when the client computing device requests web content from the web server system (e.g. one of the web server systems 112-116). The instrumentation code include instructions to send collected telemetry data one or more requests. For example, the affinity server system 130 may receive collected telemetry data directly from a client computing device (e.g. one of the client computing devices 102-104) or indirectly via one or more other computers, such as a web server system (e.g. one of the web server systems 112-116) interacting with the client computing device.

In some examples, the affinity server system 130 provides instrumentation code to collect telemetry data during one or more particular interaction types. For example, the affinity server system 130 may provide instrumentation code to a client computing device (e.g. one of the client computing devices 102-104) when the client computing device requests to log in to a web server system. The affinity server system 130 may provide instrumentation code for one or more specific transaction types, such as login transactions, other authentication transactions, purchase transactions, financial transactions, data submission, account creation, and/or other transaction types. An interaction for which the affinity server system 130 collects telemetry data using instrumentation code is also referred to herein as a monitored interaction.

In some examples, the affinity server system 130 provides different instrumentation code in different situations. For example, the affinity server system 130 may provide different instrumentation code to clients of different web server systems (e.g. web server systems 112-116). In some examples, the affinity server system 130 provides different instrumentation code for different client computing devices (e.g. client computing devices 102-104). For example, different instrumentation code may be provided when client computing devices (e.g. client computing devices 102-104) are running different browsers, operating systems, or other software (including different versions thereof), or when the affinity server system 130 determines that the client computing devices (e.g. client computing devices 102-104) pose a different amount or type of security risk.

The instrumentation code may be provided in different formats. For example, the instrumentation code may include JavaScript code, and/or other web code that executes in a browser or other JavaScript engine at the client computing device. In some examples, the instrumentation code may include bytecode, such as JavaScript bytecode. The instrumentation code may be provided with web code requested by the client computing device. In some examples, the instrumentation code may be obfuscated to prevent an attacker from understanding the instrumentation code, and/or integrated with the web code to prevent execution of the web code without execution of the instrumentation code.

In some examples, at least a portion of the instrumentation code is provided in an application installed at the client computing device (e.g. one of the client computing devices 102-104) by providing a Software Development Kit (SDK) to a developer of the application. When the application at the client computing device (e.g. one of the client computing devices 102-104) interacts with the application server of the web server system, the application may interact with the affinity server system 130, such as by sending telemetry data and/or obtaining additional instrumentation code for execution at the client computing device (e.g. one of the client computing devices 102-104).

The instrumentation code may collect telemetry data about particular signals at one or more client computing devices (e.g. client computing devices 102-104). As used herein, the term "signal" refers to a specific type of data to collect at a client computing device, such as a particular property and/or aspect of a computing environment, one or more operating states of the client computing device, one or more operations performed at the client computing device, user interaction at the client computing device, and/or other properties and/or aspects the client computing device. Other signals may include network properties, operating system properties, browser properties, installed software properties, display size, other hardware properties, device configuration properties, information about execution of web code or other web content, information about processing of web content, information about human or software interactions with the web content, information about user inputs at the client computing device, and other signals that are collectable when the instrumentation code is executed at the client computing device. In some examples, a different number of signals may be collected for different interactions, different web server systems (e.g. web server systems 112-116), and/or different computing devices.

Referring to FIG. 5A, a diagram of an example of telemetry data is illustrated. The telemetry data 500 is generated at a client computing device (e.g. client computing devices 102-104) when instrumentation code provided by a security server system (e.g. affinity server system 130) is executed at the client computing device. The telemetry data 500 includes a plurality of signal values 502-518. As used herein, the term "signal value" refers to a value for a signal (e.g. the specific type of data) at the client computing device, as detected by the instrumentation code. For example, a signal may be an IP address, while a signal value collected at a client computing device is the IP address of the client computing device (e.g. "123.456.78.9").

Instrumentation code executing at a client computing device (e.g. client computing devices 102-104) can collect signal values 502-518 for a set of specified signals. For example, the instrumentation code may collect a display size signal of the corresponding client computing device (e.g. one of the client computing devices 102-104), and the reported signal value 502 for the display size signal may indicate dimensions of a display of the corresponding client computing device, such as 1440×4560 pixels.

In some examples, an affinity server system (e.g. affinity server system 130) provides instrumentation code to a plurality of client computing devices (e.g. client computing devices 102-104), receives the telemetry data generated at the plurality of client computing devices, and processes the telemetry data to update de-identified visit data (e.g. de-identified visit data 220). For example, the affinity server system 130 may process the telemetry data received in association with a particular request from a client computing device (e.g. one of the client computing devices 102-104) to a web server system (e.g. one of the web server systems 112-116). The affinity server system 130 may determine a particular assigned UID and a particular group for the particular request based on the telemetry data.

Classifying Signals and Classifying Signal Identifier (CSID)

In some examples, the telemetry data 500 includes classifying signal values 520 for a set of one or more classifying signals. The classifying signals are used to classify the client computing device (e.g. one of client computing devices 102-104) and/or a particular user on the client computing device corresponding to the telemetry data 500. The classifying signal values 520 include at least a subset of the signal values 502-518 in the collected telemetry data 500. For example, the classifying signal values 520 include four signal values 502-508. The telemetry data 500 may include other signal values 510-518 that are not included in the classifying signal values 520. In some examples, the telemetry data 500 includes only the classifying signal values 520.

The classifying signal values 520 may be selected to achieve a particular granularity of classification. For example, if client computing devices are classified based on APN, there will be fewer expected classifications than when the telemetry data is classified based on IP address.

The affinity server system 130 generates a classifying signal identifier (CSID) corresponding to the interaction based on the classifying signal values 520 in the telemetry data 500. A CSID can be generated or otherwise determined based on telemetry data received from the client computing device involved in the request or other interaction. The CSID for an interaction may include one or more classifying signal values 520, one or more derived values that generated based on one or more classifying signal values 520, or a combination thereof.

In some examples, the CSID is the unprocessed classifying signal values 520 for the set of classifying signals. Alternatively and/or in addition, the CSID may be determined by processing one or more of the classifying signal values 520. For example, a deterministic function, such as a hash or another function, may be applied to the classifying signal values 520 to generate the CSID.

In some examples, the classifying signal values 520 are collected for classifying signals that are expected to be static and/or infrequently changing on the client computing device (e.g. one of the client computing devices 102-104), such as a display size, an operating system type, and/or another static or infrequently changing signal. When an infrequently changing signal is used, a transaction by the same client computing device may have telemetry data that generates a different CSID than a prior transaction. However, the change in CSID is expected to happen infrequently, and the client computing device will develop a newer transaction history with the newer CSID.

An affinity server system (e.g. affinity server system 130) may generate a CSID for one or more interactions between a web server system (e.g. web server system 112) and a client computing device (e.g. client computing device 102). For example, the affinity server system 130 may collect telemetry data, receive the telemetry data, and determine a CSID based on the telemetry data.

Referring to FIG. 5B, a diagram of an example of telemetry data and CSID for a set of interactions is illustrated. In this example, the telemetry data is for the same processed interactions appearing in FIG. 2B. Interaction 1 is between UID1 and website WS1. A client computing device associated with UID1 submitted telemetry data 552. Interaction 2 is between UID2 and website WS2. A client computing device associated with UID2 submitted telemetry data 554. Interaction 3 is between UID3 and website WS1. A client computing device associated with UID3 submitted telemetry data 556. Interaction 4 is between UID4 and website WS1. A client computing device associated with UID4 submitted telemetry data 558. Interaction 5 is between UID5 and website WS2. A client computing device associated with UID5 submitted telemetry data 560.

An affinity server system (e.g. affinity server system 130) generates a CSID for the interactions based on the respective classifying signal values 562-570. The telemetry data 552-560 each include a set of classifying signal values 462-468. The CSID generated for Interactions 1-3 are the same (CSID1), because the classifying signal values 562, 564, and 565 match (a, b, c, d). The CSID generated for Interactions 4 is CSID2. The CSID generated for Interaction 5 is CSID3.

Referring to FIG. 5C, a table of an example of de-identified visit data is illustrated. In some examples, the affinity server system 130 uses the CSID generated for an interaction as a group ID. For example, in de-identified visit data 580: the group ID for the interaction between UID1 and WS1 is CSID1; the group ID for the interaction between UID2 and WS2 is CSID1; the group ID for the interaction between UID3 and WS1 is CSID1; the group ID for the interaction between UID4 and WS1 is CSID2; and the group ID for the interaction between UID5 and WS2 is CSID3.

Example System Architecture

Figure 6:
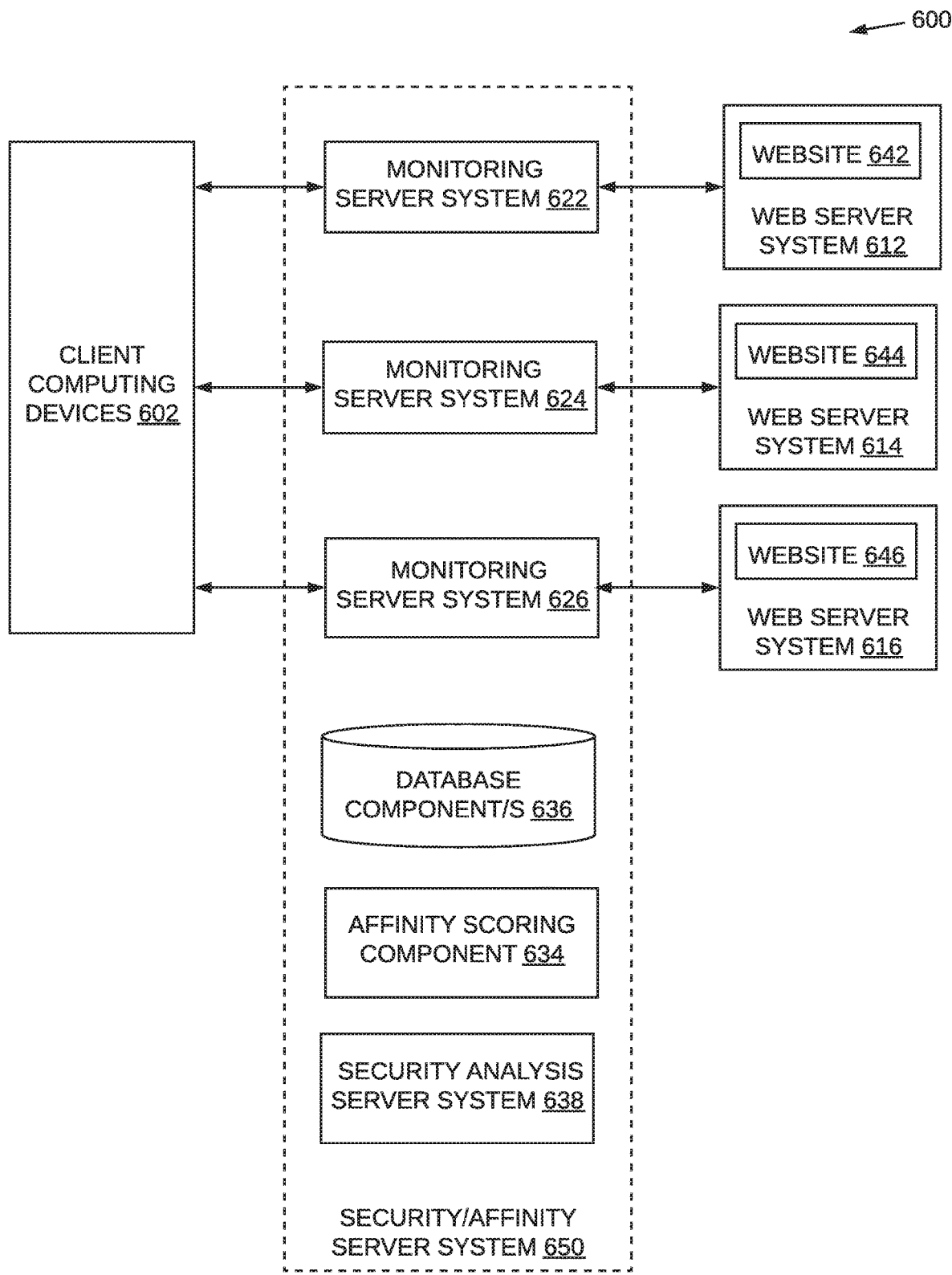
FIG. 6 is a block diagram of an exemplary system that includes another example of a security/affinity server system for security and privacy-enforced affinity scoring.

Referring to FIG. 6, an exemplary system 600 that includes another example of a security/affinity server system 650 for security and privacy-enforced affinity scoring is illustrated. In this example, the client computing device 602 is the same in structure and operation as the client computing devices 102-104 illustrated and described in the examples in FIG. 1, except as otherwise illustrated and described by way of the examples herein. Additionally, the security/affinity server system 650 in FIG. 6 is the same in structure and operation as the affinity server system 130 illustrated and described in the examples in FIG. 1, except as otherwise illustrated and described by way of the examples herein. Further, the web server systems 612-616 in FIG. 6 are the same in structure and operation as the web server systems 112-116 as illustrated and described in the examples in FIG. 1, except as otherwise illustrated and described by way of the examples herein.

In this example, the computer system 600 includes a security/affinity server system 650 that provides security services and/or affinity scoring services to a plurality of web server systems 612-616 that hosts websites 642-646, making web content available to the client computing device 602 over a network, although the systems may have other systems, devices, components or other elements in other configurations. Although one client computing device 602 is illustrated, this examples may include a plurality of client computing devices that interact with one or more web server systems 612-616 that are monitored by the security/affinity server system 650.

The security/affinity server system 650 may include one or more monitoring server systems 622-626. In this example, a monitoring server system 622 is associated with one or more web server systems 612-616. The monitoring server systems 622-626 monitor interactions between client computing device 602 and one or more of the web server systems 612-616 to perform security and/or affinity scoring functionality with respect to the monitored interactions.

A monitoring server system 622 that is associated with a particular web server system 612 performs one or more actions during interactions between client computing device 602 and the particular web server system 612. For example, the monitoring server system 622 may provide instrumentation code to client computing device 602 that interact with the corresponding web server system 612, and may process the telemetry data received from the client computing devices 602. Although FIG. 6 shows a one-to-one relationship between web server systems 612-616 and monitoring server systems 622-626, other configurations may be implemented.

The affinity/security server system 650 includes one or more database components 636. For example, the affinity/security server system 650 may include a database component 636 that stores de-identified visit data collected for one or more websites 642-646. Alternatively and/or in addition, the affinity/security server system 650 may include a database component 636 that stores telemetry data. The telemetry data may include telemetry data collected when providing security services and/or affinity scoring services. In some examples, a monitoring server system 622 updates the database component 636 after processing request data associated with a web server system 616 monitored by the monitoring server system 622.

In some examples, the affinity/security server system 650 includes an affinity scoring component 636 that generates affinity data that is related to a particular client computing device (e.g. client computing device 602) and provides the affinity data related to request/device/user for use by a web server system (e.g. one of the web server system 612-616). In some examples, when a particular web server system 612 requests affinity data, the corresponding monitoring server system 622 may obtain security data from the affinity scoring component 634. The affinity scoring component 634 may access one or more database components 636 to generate affinity data corresponding to a set of websites 642-646. In some examples, the monitoring server system 622 requests group visit data from the affinity scoring component 634 and/or a database component 636, and the monitoring server system 622 generates affinity data based on the generated group visit data.

A monitoring server system 622 may be positioned in various network configurations with respect to an associated one or ones of the web server systems 612-616. For example a monitoring server system 622 may be deployed in an in-line configuration, an out-of-band configuration, or another configuration that allows the monitoring server system 622 to perform actions relating to requests, transactions and/or other interactions as they occur between the client computing device 602 and/or other client computing devices and one or more associated web server systems 612-616.

In this example, in an in-line configuration, a monitoring server system 622 may as a reverse proxy server to an associated one of the web server systems 612-616 by intercepting one or more communications between the client computing device 602 and the associated one of the web server systems 612-616. As a reverse proxy server, the monitoring server system 622 retrieves resources, such as web content, on behalf of the clients of the associated one of the web server systems 612-616. To the client computing device 602, the resources appears to originate from the associated one of the web server systems 612-616.

The monitoring server system 622 may be deployed locally to the web server system 612 or deployed over the Internet with respect to the web server systems 612-616, such as in a cloud computing system managed by a security company, and/or in a computer system operated by a security company. For example, the monitoring server system 622 may intercept messages to the client computing device 602 and add instrumentation code for execution at the client computing devices 602. As another example, the monitoring server system 622 may intercept requests to the associated one of the web server systems 612-616 that include collected telemetry data from the client computing devices 602, process the telemetry data, and forward the requests to the associated one of the web server systems 612-616.

In an out-of-band configuration, a monitoring server system 622 may be involved in transactions and/or other interactions without intercepting communications between the client computing device 602 and the associated one of the web server systems 612-616. For example, a web server system 612 may obtain instrumentation code from the corresponding monitoring server system 622, provide the instrumentation code to the client computing devices 602, receive telemetry data generated at the client computing devices 602, and/or provide the corresponding monitoring server system 622 the telemetry data received from the client computing devices 602.

In some examples, the security/affinity server system 650 is operated by a security company or another entity that provides web security services. One or more web server systems 612-616 may be operated by security service customers, or entities that are provided security services by the security company. The security/affinity server system 650 protects the web server systems 612-616 of security service customers from attacks, such as attacks by malicious automated software executing on client computing devices 602.

In some examples, the monitoring server systems 622-626 analyze requests, transactions and/or other interactions between the client computing device 602 and the associated web server systems 612-616 to detect and mitigate attacks on the associated web server systems 612-616. For example, a defense server system 622 may collect and evaluate telemetry data corresponding to a transaction to determine whether the transaction is involved in an attack, such as whether a client computing device involved in the transaction is controlled by automated malicious software. The monitoring server systems 622-626 may analyze telemetry data for an interaction to prevent an attack in real time, such as by such as blocking, redirecting, or flagging communications that correspond to the interaction.

When analyzing telemetry data to provide security services, the monitoring server systems 622-626 may store the telemetry data in a database component 636. Telemetry data stored in a database component 636, including any telemetry data collected to implement security services, is available for implementing security measures for security and privacy-enforced affinity scoring as described herein. In some examples, one or more signals collected to provide security services (e.g. signal values 502-518) are used as identifying signals (e.g. signal values 402-408, identifying signal values 420) to implement security measures for extended sessions.

The security/affinity server system 650 may include a security analysis server system 638 that evaluates telemetry data collected at the client computing device 602 or other client computing devices to detect signatures or other properties of transactions initiated by malicious software executing on the client computing device 602 or other client computing devices. The security analysis server system 538 may use telemetry data collected for multiple web server systems 612-616 to learn about new attacks and/or to deploy new countermeasures for real-time attack detection and prevention. For example, the security analysis server system 638 may update individual monitoring server systems 622-626 with the new countermeasures so that the monitoring server systems 622-626 may use the new security countermeasures to process transactions between associated web server systems 612-616 and client computing device 602 or other client computing devices in real time. The new countermeasures may include countermeasures that are usable to implement security measures for extended sessions and/or countermeasures that are usable to provide other security services.

Example Process

Figure 7:
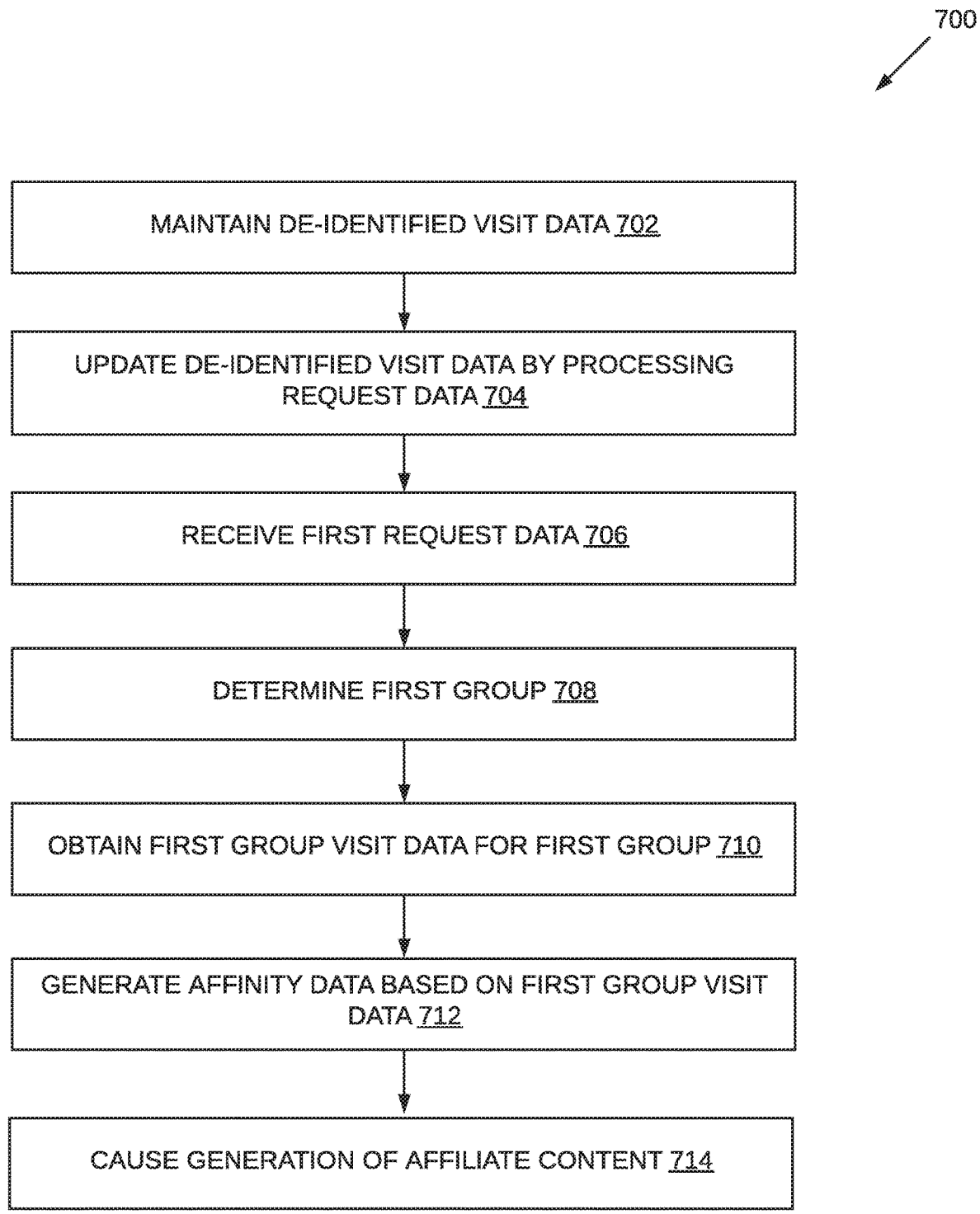
FIG. 7 is a flow chart of an example of method for security and privacy-enforced affinity scoring.

Referring to FIG. 7, a flow chart of an examples of a method for security and privacy-enforced affinity scoring is illustrated. In this example, the method 700 may be performed by one or more computing devices and/or processes thereof. For example, one or more steps of method 700 may be performed by a computer system, such as but not limited to computer system 800. In some examples, one or more steps of method 700 are performed by a security server system, which may include one or more monitoring server systems and/or analysis server systems. Method 700 will be described with respect to the affinity server system 130 of FIG. 1, but is not limited to performance by such and may by way of example only be executed by security/affinity server system 650.

At step 702, the affinity server system 130 maintains de-identified visit data to a plurality of websites 122-126 from a plurality of assigned UIDs corresponding to a plurality of clients (e.g. client computing devices 102-104 and/or users at client computing devices 102-014). The plurality of assigned UIDs include a different assigned UID for each client-website pair. The de-identified visit data associates the plurality of assigned UIDs to a plurality of groups.

At step 704, the affinity server system 130 updates the de-identified visit data by processing request data for a plurality of requests from the plurality of clients to the plurality of websites 122-126.

At step 706, the affinity server system 130 receives first request data corresponding to a first request from a client computing device (e.g. one of the client computing devices 102-104) to a web server system (e.g. one of the web server systems 112-116).

At step 708, the affinity server system 130 determines a first group from the plurality of groups based on the first request data. In some examples, the first group is based on one or more client property values in the request data. The client property values may include signal values collected at the client computing device (e.g. one of the client computing devices 102-104) when instrumentation code executes on the client computing device. In some examples, the first group is based on a CSID generated based on signal values collected at the client computing device.

At step 710, the affinity server system 130 obtains first group visit data describing visits to a set of websites of the plurality of websites 122-126 by assigned UIDs belonging to the first group. The affinity server system 130 may obtain the first group visit data from the de-identified visit data. For example, the affinity server system 130 may process at least a portion of the de-identified visit data corresponding to the first group.

At step 712, the affinity server system 130 generates affinity data based on the first group visit data. The affinity data describes aggregated and de-identified visits to one or more websites by assigned UIDs that belong to the group determined for the client computing device (e.g. one of the client computing devices 102-104). In some examples, the affinity data includes at least one affinity score for a website of the plurality of websites. For example, the at least one affinity score may include a numeric affinity score, a probabilistic value, a level, another categorization, an ordering, or another affinity score.

At step 714, the affinity server system 130 causes generation of affiliate content based on the affinity data, the affiliate content corresponding to one or more websites of the plurality of websites. For example, the affinity server system 130 may cause generation of the affiliate content by sending the affinity data to the web server system. The affiliate content may include ordered content for one or more websites, where the ordering is based on the affinity data.

Implementation Mechanisms—Hardware Overview

According to one example, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 8:
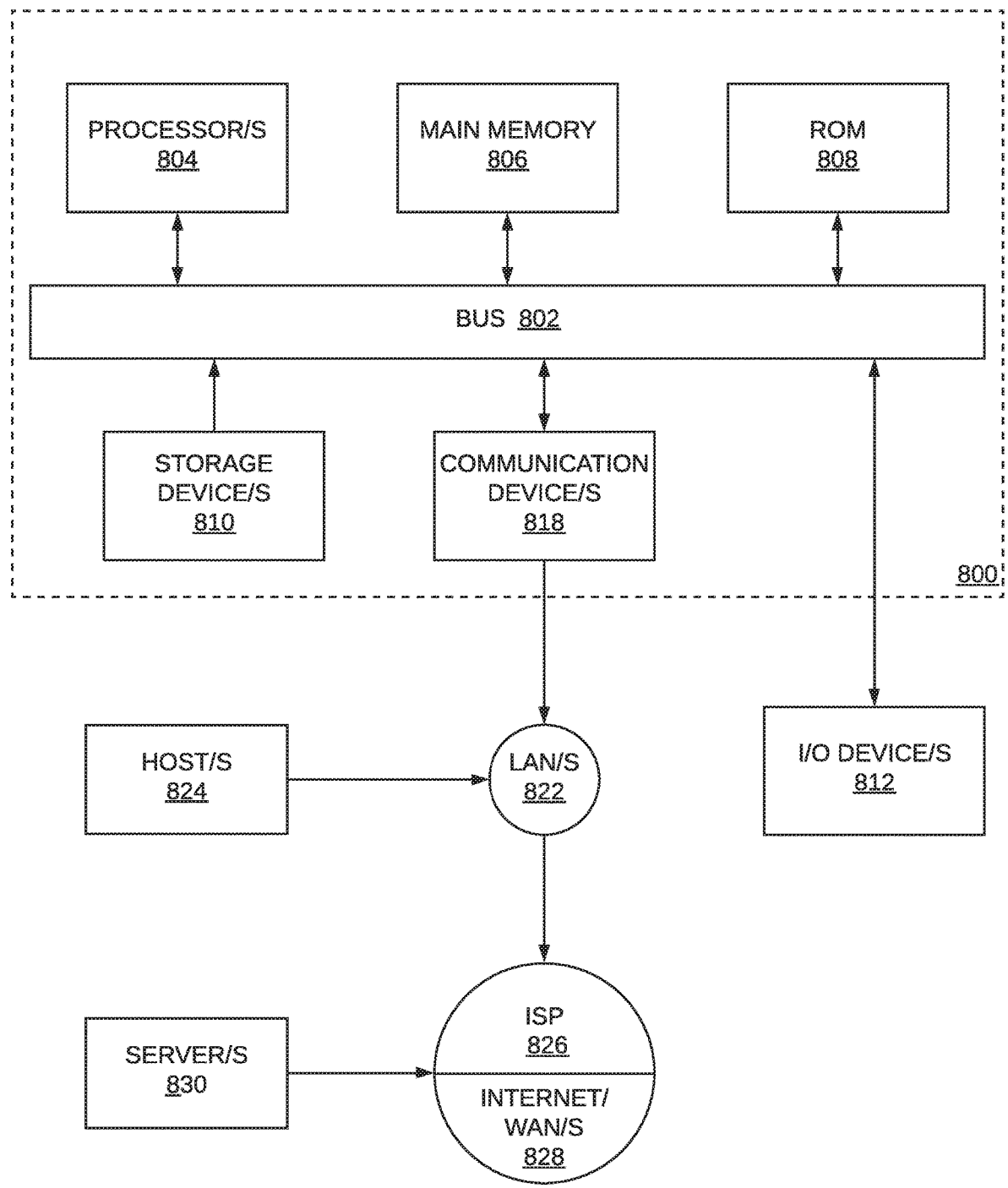
FIG. 8 illustrates a computer system upon which an example may be implemented.

FIG. 8 illustrates a computer system upon which an example may be implemented. Computer system 800 includes a bus 802 or other communication mechanism for communicating information, and one or more hardware processors 804 coupled with bus 802 for processing information, such as basic computer instructions and data. Hardware processor(s) 804 may include, for example, one or more general-purpose microprocessors, graphical processing units (GPUs), coprocessors, central processing units (CPUs), and/or other hardware processing units.

Computer system 800 also includes one or more units of main memory 806 coupled to bus 802, such as random access memory (RAM) or other dynamic storage, for storing information and instructions to be executed by processor(s) 804. Main memory 806 may also be used for storing temporary variables or other intermediate information during execution of instructions to be executed by processor(s) 804. Such instructions, when stored in non-transitory storage media accessible to processor(s) 804, turn computer system 800 into a special-purpose machine that is customized to perform the operations specified in the instructions. In some examples, main memory 806 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 800 may further include one or more units of read-only memory (ROM) 808 or other static storage coupled to bus 802 for storing information and instructions for processor(s) 804 that are either always static or static in normal operation but reprogrammable. For example, ROM 808 may store firmware for computer system 800. ROM 808 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 810, such as a magnetic disk or optical disk, is provided and coupled to bus 802 for storing information and/or instructions. Storage device(s) 810 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 800 may be coupled via bus 802 to one or more input/output (I/O) devices 812. For example, I/O device(s) 812 may include one or more displays for displaying information to a computer user, such as a cathode ray tube (CRT) display, a Liquid Crystal Display (LCD) display, a Light-Emitting Diode (LED) display, a projector, and/or any other type of display.

I/O device(s) 812 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 804 and for controlling cursor movement on another I/O device (e.g. a display). This input device typically has at degrees of freedom in two or more axes, (e.g. a first axis x, a second axis y, and optionally one or more additional axes z. . . ), that allows the device to specify positions in a plane. In some examples, the one or more I/O device(s) 812 may include a device with combined I/O functionality, such as a touch-enabled display.

Other I/O device(s) 812 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor(s) 804 over bus 802.

Computer system 800 may implement the techniques described herein using customized hard-wired logic, one or more ASICs or FPGAs, firmware or program logic which, in combination with the computer system causes or programs, causes computer system 800 to be a special-purpose machine. According to one example, the techniques herein are performed by computer system 800 in response to processor(s) 804 executing one or more sequences of one or more instructions contained in main memory 806. Such instructions may be read into main memory 806 from another storage medium, such as one or more storage device(s) 810. Execution of the sequences of instructions contained in main memory 806 causes processor(s) 804 to perform the process steps described herein. In alternative examples, hard-wired circuitry may be used in place of or in combination with software instructions.

Computer system 800 also includes one or more communication interfaces 818 coupled to bus 802. Communication interface(s) 818 provide two-way data communication over one or more physical or wireless network links 820 that are connected to a local network 822 and/or a wide area network (WAN), such as the Internet. For example, communication interface(s) 818 may include an integrated services digital network (ISDN) card, cable modem, satellite modem, or a modem to provide a data communication connection to a corresponding type of telephone line. Alternatively and/or in addition, communication interface(s) 818 may include one or more of: a local area network (LAN) device that provides a data communication connection to a compatible local network 822; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 828); and other networking devices that establish a communication channel between computer system 800 and one or more LANs 822 and/or WANs.

Network link(s) 820 typically provides data communication through one or more networks to other data devices. For example, network link(s) 820 may provide a connection through one or more local area networks 822 (LANs) to one or more host computers 824 or to data equipment operated by an Internet Service Provider (ISP) 826. ISP 826 in turn provides connectivity to one or more wide area networks 828, such as the Internet. LAN(s) 822 and WAN(s) 828 both use electrical, electromagnetic or optical signals that carry digital data streams. The signals through the various networks and the signals on network link(s) 820 and through communication interface(s) 818 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its main memory 806 and send the instructions over a telecommunications line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 can send messages and receive data, including program code, through the network(s), network link 820 and communication interface 818. In the Internet example, one or more servers 830 might transmit signals corresponding to data or instructions requested for an application program executed by the computer system 800 through the Internet 828, ISP 826, local network 822 and a communication interface 818. The received signals may include instructions and/or information for execution and/or processing by processor(s) 804. Processor(s) 804 may execute and/or process the instructions and/or information upon receiving the signals by accessing main memory 806, or at a later time by storing them and then accessing them from storage device(s) 810.

Other Aspects of Disclosure

In the foregoing specification, examples of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented by a security system comprising one or more affinity server devices, web server systems, or client computing devices, the method comprising:
   maintaining de-identified visit data to a plurality of websites from a plurality of assigned user identifiers (UIDs) corresponding to a plurality of clients, the plurality of assigned UIDs including a different assigned UID for each client-website pair, the de-identified visit data associating the plurality of assigned UIDs to a plurality of groups;
   determining a first group from the plurality of groups based on first request data corresponding to a first request from a client to a web server system;
   obtaining, from the de-identified visit data, first group visit data describing visits to a set of plurality of websites by the plurality of assigned UIDs belonging to the first group;
   generating, based on the obtained first group visit data, affinity data comprising at least one affinity score for at least one of the websites; and
   causing generation of affiliate content based on the generated affinity data, the affiliate content corresponding to the at least one of the plurality of web sites.

2. The method of claim 1, wherein the determining the first group from the plurality of groups based on the first request data further comprises:
   processing the first request data to determine one of the plurality of groups for each assigned UID of the plurality of assigned UIDs based on one or more client property values of request data for a corresponding request of a plurality of requests.

3. The method of claim 1, further comprising:
   providing instrumentation code to the plurality of clients, wherein the instrumentation code collects telemetry data when executed at the plurality of clients; and
   receiving the telemetry data generated at the plurality of clients;
   wherein the determining the first group from the plurality of groups based on the first request data further comprises:
   determining a particular assigned UID and a particular group based on the telemetry data corresponding to the first request; and
   determining classifying signal data (CSID) based on the telemetry data corresponding to the first request.

4. The method of claim 1, further comprising:
   providing security services to at least one affiliate web server system that hosts an affiliate website of the plurality of websites, wherein the security services provide instrumentation code to one or more clients that interact with the affiliate website and wherein the instrumentation code collects telemetry data when executed at the one or more clients; and
   receiving the telemetry data generated at the one or more clients.

5. The method of claim 1, further comprising:
   generating affinity content code that, when executed at the client, displays the affiliate content; and
   providing the generated affinity content code to the client, wherein the affinity content code when executed at the client obtains the affiliate content from the web server system.

6. A non-transitory computer readable medium having stored thereon instructions comprising executable code that, when executed by one or more processors, causes the one or more processors to:
   maintain de-identified visit data to a plurality of websites from a plurality of assigned user identifiers (UIDs) corresponding to the plurality of clients, the plurality of assigned UIDs including a different assigned UID for each client-website pair, the de-identified visit data associating the plurality of assigned UIDs to a plurality of groups;
   determine a first group from the plurality of groups based on first request data corresponding to a first request from a client to a web server system;
   obtain, from the de-identified visit data, first group visit data describing visits to a set of the websites by assigned UIDs belonging to the first group;
   generate, based on the obtained first group visit data, affinity data comprising at least one affinity score for at least one of the websites; and
   cause generation of affiliate content based on the generated affinity data, the affiliate content corresponding to the at least one of the websites.

7. The non-transitory computer readable medium of claim 6, wherein for the determine the first group from the plurality of groups based on the first request data, the executable code, when executed by the processors further causes the one or more processors to:
   process the request data to determine one of the groups for each assigned UID of the plurality of assigned UIDs based on one or more client property values of request data for a corresponding request of a plurality of requests.

8. The non-transitory computer readable medium of claim 6, wherein the executable code, when executed by the processors further causes the one or more processors to:
   provide instrumentation code to the plurality of clients, wherein the instrumentation code collects telemetry data when executed at the plurality of clients; and
   receive the telemetry data generated at the plurality of clients;
   wherein the determine the first group from the plurality of groups based on the first request data further comprises:
   determining a particular assigned UID and a particular group based on the telemetry data corresponding to the first request data; and
   determining classifying signal data (CSID) based on the telemetry data corresponding to the first request data.

9. The non-transitory computer readable medium of claim 6, wherein the executable code, when executed by the processors further causes the one or more processors to:
   provide security services to at least one affiliate web server system that hosts an affiliate website of the plurality of websites, wherein the security services provide instrumentation code to one or more clients that interact with the affiliate website and wherein the instrumentation code collects telemetry data when executed at the one or more clients; and
   receive the telemetry data generated at the one or more clients.

10. The non-transitory computer readable medium of claim 6, wherein the executable code, when executed by the processors further causes the one or more processors to:
   generate affinity content code that, when executed at the client, displays the affiliate content; and provide the affinity content code to the client, wherein the affinity content code when executed at the client obtains the affiliate content from the web server system.

11. An affinity server apparatus, comprising memory comprising programmed instructions stored thereon and one or more processors configured to be capable of executing the stored programmed instructions to:
  maintain de-identified visit data to a plurality of websites from a plurality of assigned user identifiers (UIDs) corresponding to the plurality of clients, the plurality of assigned UIDs including a different assigned UID for each client-website pair, the de-identified visit data associating the plurality of assigned UIDs to a plurality of groups;
  determine a first group from the plurality of groups based on first request data corresponding to a first request from a client to a web server system;
  obtain, from the de-identified visit data, first group visit data describing visits to a set of the websites by assigned UIDs belonging to the first group;
  generate, based on the obtained first group visit data, affinity data comprising at least one affinity score for at least one of the websites; and
  cause generation of affiliate content based on the generated affinity data, the affiliate content corresponding to the at least one of the websites.

12. The apparatus of claim 11, wherein for the determine the first group from the plurality of groups based on the first request data, the processors are further configured to be capable of executing the stored programmed instructions to:
  process the request data to determine one of the groups for each assigned UID of the plurality of assigned UIDs based on one or more client property values of request data for a corresponding request of a plurality of requests.

13. The apparatus of claim 11, wherein the processors are further configured to be capable of executing the stored programmed instructions to:
  providing instrumentation code to the plurality of clients, wherein the instrumentation code collects telemetry data when executed at the plurality of clients; and
  receiving the telemetry data generated at the plurality of clients;
  wherein the determining the first group from the plurality of groups based on the first request data further comprises
    determining a particular assigned UID and a particular group based on the telemetry data corresponding to the first request data; and
    determining classifying signal data (CSID) based on the telemetry data corresponding to the first request data.

14. The apparatus of claim 11, wherein the processors are further configured to be capable of executing the stored programmed instructions to:
  provide security services to at least one affiliate web server system that hosts an affiliate website of the plurality of websites, wherein the security services provide instrumentation code to one or more clients that interact with the affiliate website and wherein the instrumentation code collects telemetry data when executed at the one or more clients; and
  receive the telemetry data generated at the one or more clients.

15. The apparatus of claim 11, wherein the processors are further configured to be capable of executing the stored programmed instructions to:
  generate affinity content code that, when executed at the client, displays the affiliate content; and
  provide the affinity content code to the client, wherein the affinity content code when executed at the client obtains the affiliate content from the web server system.

16. A security system, comprising one or more affinity server apparatuses, server devices, or clients with memory comprising programmed instructions stored thereon and one or more processors configured to be capable of executing the stored programmed instructions to:
  maintain de-identified visit data to a plurality of websites from a plurality of assigned user identifiers (UIDs) corresponding to the plurality of clients, the plurality of assigned UIDs including a different assigned UID for each client-website pair, the de-identified visit data associating the plurality of assigned UIDs to a plurality of groups;
  determine a first group from the plurality of groups based on first request data corresponding to a first request from a client to a web server system;
  obtain, from the de-identified visit data, first group visit data describing visits to a set of the websites by assigned UIDs belonging to the first group;
  generate, based on the obtained first group visit data, affinity data comprising at least one affinity score for at least one of the websites; and
  cause generation of affiliate content based on the generated affinity data, the affiliate content corresponding to the at least one of the websites.

17. The system of claim 16, wherein for the determine the first group from the plurality of groups based on the first request data, the processors are further configured to be capable of executing the stored programmed instructions to:
  process the request data to determine one of the groups for each assigned UID of the plurality of assigned UIDs based on one or more client property values of request data for a corresponding request of the plurality of requests.

18. The system of claim 16, wherein the processors are further configured to be capable of executing the stored programmed instructions to:
  providing instrumentation code to the plurality of clients, wherein the instrumentation code collects telemetry data when executed at the plurality of clients; and
  receiving the telemetry data generated at the plurality of clients;
  wherein the determining the first group from the plurality of groups based on the first request data further comprises
    determining a particular assigned UID and a particular group based on the telemetry data corresponding to the first request data; and
    determining classifying signal data (CSID) based on the telemetry data corresponding to the first request data.

19. The system of claim 16, wherein the processors are further configured to be capable of executing the stored programmed instructions to:
  provide security services to at least one affiliate web server system that hosts an affiliate website of the plurality of websites, wherein the security services provide instrumentation code to one or more clients that interact with the affiliate website and wherein the instrumentation code collects telemetry data when executed at the one or more clients; and
  receive the telemetry data generated at the one or more clients.

20. The system of claim 16, wherein the processors are further configured to be capable of executing the stored programmed instructions to:
generate affinity content code that, when executed at the client, displays the affiliate content; and
provide the affinity content code to the client, wherein the affinity content code when executed at the client obtains the affiliate content from the web server system.

* * * * *